United States Patent [19]

Karsh

[11] 4,093,151
[45] June 6, 1978

[54] WEB TRANSPORTING APPARATUS AND WEB CARTRIDGES

[75] Inventor: Irving Karsh, Los Angeles, Calif.

[73] Assignee: Bell & Howell Company, Chicago, Ill.

[21] Appl. No.: 714,739

[22] Filed: Aug. 16, 1976

[51] Int. Cl.² ............................................. G11B 23/10
[52] U.S. Cl. .................................... 242/198; 242/201; 242/209
[58] Field of Search ............... 242/199, 200, 198, 197, 242/192, 189, 190, 209, 201, 202, 203, 71.2, 55.19 A; 360/99, 132

[56] References Cited

U.S. PATENT DOCUMENTS

| | | | |
|---|---|---|---|
| 2,911,161 | 11/1959 | Proctor | 242/200 |
| 3,650,495 | 3/1972 | Boyer | 242/192 |
| 3,661,344 | 5/1972 | Nakamura et al. | 242/199 |
| 3,758,048 | 9/1973 | Sugaya et al. | 242/198 |
| 3,907,230 | 9/1975 | Merle et al. | 242/192 |

Primary Examiner—George F. Mautz
Attorney, Agent, or Firm—Benoit Law Corporation

[57] ABSTRACT

Apparatus for transporting a web from a first reel to a second reel and cartridges for housing a web and distinct first and second web reels have a pair of distinct turntable structures for individually receiving, supporting and rotating the two reels. The turntable structures preferably are rotatably mounted on a base which may be the base portion of a web cartridge. In the latter case, the web cartridge has a cover complementing the base portion for housing the first and second reels when placed on the turntable structures.

20 Claims, 9 Drawing Figures

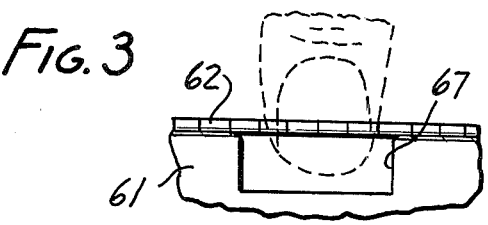
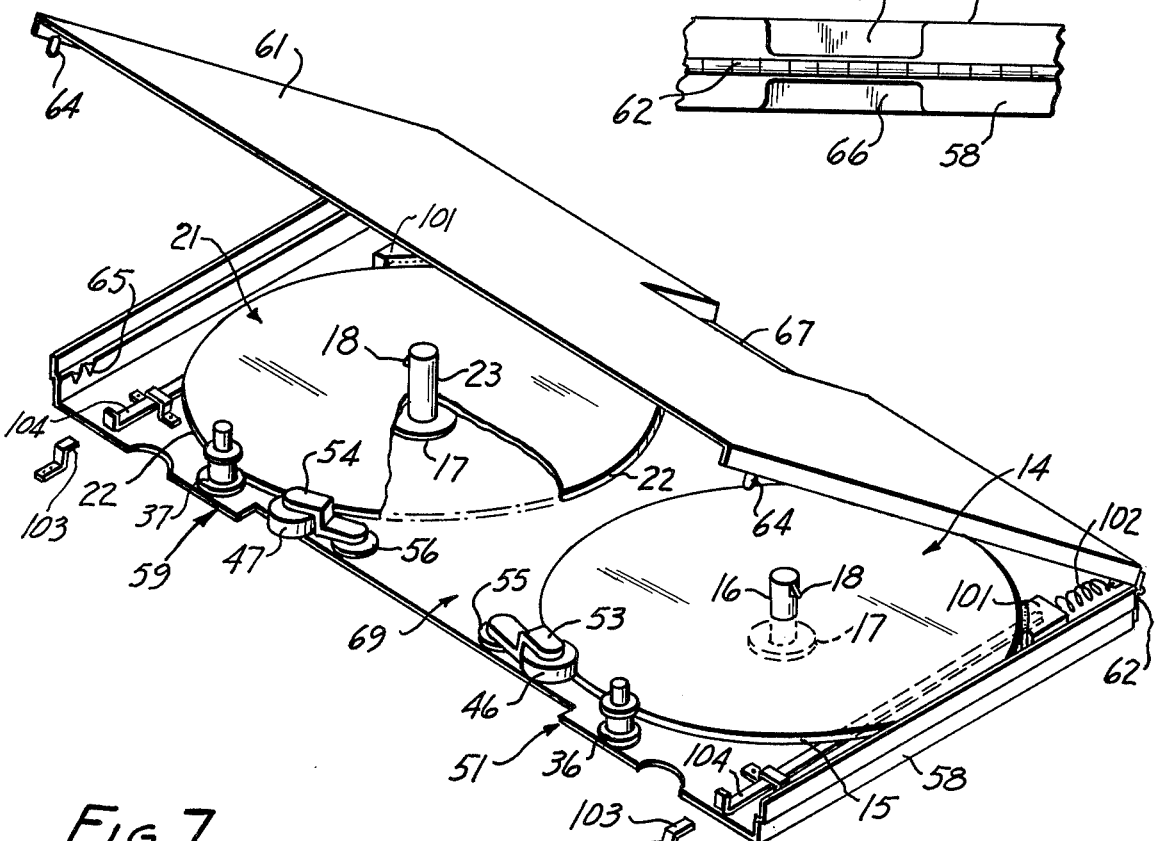
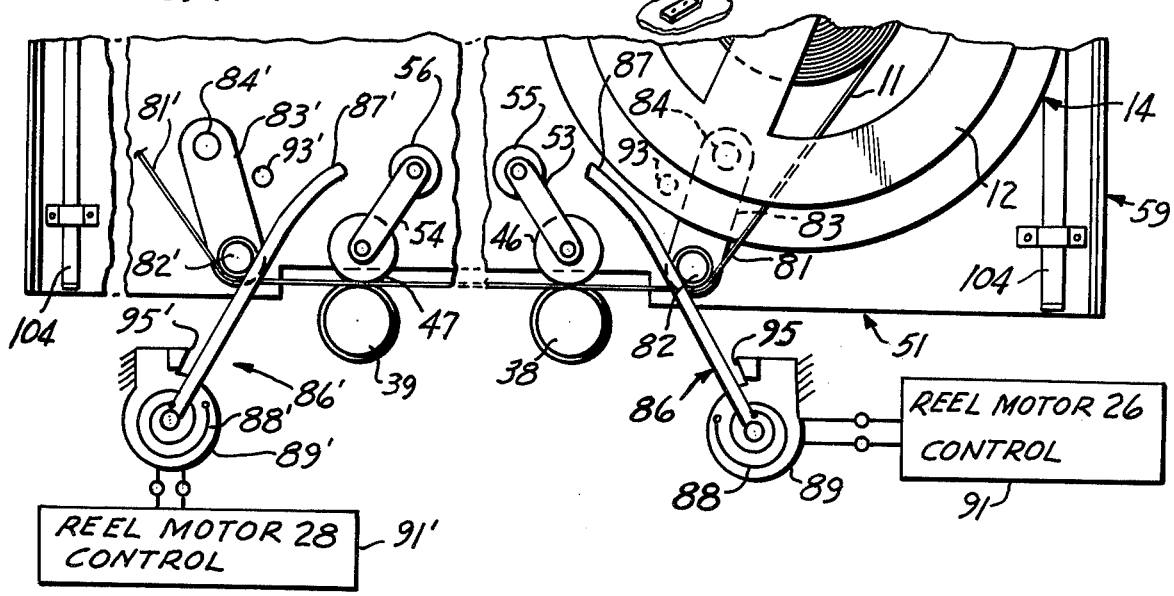

WEB TRANSPORTING APPARATUS AND WEB CARTRIDGES

BACKGROUND OF THE INVENTION

1. Field of the Invention

The subject invention relates to tape or web transportation and containment and, more specifically, to apparatus for transporting a magnetic recording tape or other web between two reels, and to tape or web cartridges.

2. Description of the Prior Art

Even though not limited to any specific fields of utility, the subject invention is believed best understandable against the background of magnetic tape recording and reproduction. In the latter area, magnetic tape cartridges have become well established as convenient and effective recording media.

Some prior-art cartridges are of the endless loop type. While the presence of an endless loop of tape in the cartridge renders tape rewinding unnecessary, it also introduces a tendency of the tape to jam. According to one proposal, an endless loose loop of magnetic recording tape was carried on a turntable which was belt driven from one of the tape guide rollers. The turntable was driven at a speed greater than that of the tape pack to provide improved takeup of slack tape in an effort to reduce the tendency of the endless loop to jam.

In practice, many applications require the use of tape reels. Prior-art reel cartridges are preloaded with tape and require special equipment when the tape is to be replaced.

Despite these disadvantages, reel-type tape cartridges and transports would be attractive in terms of convenience of operation and economy over complex belt drive tape packs of the kind shown, for instance, in U.S. Pat. No. 3,305,186, by D. L. Burdorf et al, issued Feb. 21, 1967.

In particular, it would be desirable to provide tape cartridges and transports that operate with standardized tape reels.

SUMMARY OF THE INVENTION

It is a broad object of this invention to overcome the above mentioned disadvantages and meet the above mentioned desiderata.

It is a related object of this invention to provide improved reel-type web transporting systems and apparatus.

It is a germane object of this invention to provide improved reel-type web cartridges.

It is also an object of this invention to provide improved web cartridges that are conveniently reloadable with standard tape reels.

Other objects of the invention will become apparent in the further course of this disclosure.

From one aspect thereof, the subject invention resides in apparatus for transporting a web from a first reel to a distinct second reel, comprising, in combination, means for rotating the first reel including a first turntable structure for removably receiving, supporting and rotating the first reel, means for carrying the first turntable structure including a first bearing, a first spindle rotatable in the bearing, the first spindle being attached to the first turntable structure and having means for engaging the first reel in driving relationship, and first means for engaging a peripheral portion of the first turntable structure and for rotating the first turntable structure via the peripheral portion, means for rotating the second reel including a distinct second turntable structure for removably receiving, supporting and rotating the second reel, means for carrying the second turntable structure including a second bearing, a second spindle rotatable in the second bearing, the second spindle being attached to the second turntable structure and having means for engaging the second reel in driving relationship, and second means for engaging a peripheral portion of the second turntable structure and for rotating the second turntable structure via the peripheral portion of the second turntable structure, and means for forwarding the web from either of the first and second reel to the other reel.

The latter tape forwarding means may include means for guiding the web between the first and second reels, and means including a web capstan for engaging and driving the web between the first and second reels.

From another aspect thereof, the subject invention resides in apparatus for transporting a web from a first reel to a distinct second reel comprising, in combination, means for rotating the first reel including a first turntable structure for removably receiving, supporting and rotating the first reel, means for carrying the first turntable structure including a first bearing, a first spindle rotatable in the bearing, the first spindle being attached to the first turntable structure and having means for engaging the first reel in driving relationship, and first means for engaging a peripheral portion of the first turntable structure and for rotating the first turntable structure via the peripheral portion, means for rotating the second reel including a distinct second turntable structure for removably receiving, supporting and rotating the second reel, means for carrying the second turntable structure including a second bearing, a second spindle rotatable in the second bearing, the second spindle being attached to the second turntable structure and having means for engaging the second reel in driving relationship, and second means for engaging a peripheral portion of the second turntable structure and for rotating the second turntable structure via the peripheral portion of the second turntable structure, means including a web capstan for driving the web between the first and second reels, a base for jointly supporting and rotatably mounting the first and second turntable structures, via the first and second bearings means for mounting the base for manual removal relative to the first and second peripheral portion engaging means and the web capstan, and means on the base for guiding the web toward and away from the web capstan.

From a further aspect thereof, the subject invention resides in apparatus for transporting a web from a first reel to a distinct second reel, comprising, in combination, means for rotating the first reel including a first turntable structure for removably receiving, supporting and rotating the first reel, and first means for engaging a peripheral portion of the first turntable structure and for rotating the first turntable structure via the peripheral portion, means for rotating the second reel including a distinct second turntable structure for removably receiving, supporting and rotating the second reel, and second means for engaging a peripheral portion of the second turntable structure and for rotating the second turntable structure via the peripheral portion of the second turntable structure, means including a web capstan for driving the web between the first and second reels, a base for jointly supporting and rotatably mounting the first and second turntable structures, means for forming a first web loop between the first turntable structure and the web capstan, the first loop forming means including a first web loop feeler, means for yieldably mounting the first web loop feeler on the base adjacent the first turntable structure, and first means releasably coupled to the first web loop feeler and connected to the first turntable rotating means for controlling the first turntable rotating means to maintain the first web loop, means for forming a second web loop between the second turntable structure and the web capstan, the second loop forming means including a second web loop feeler, means for yieldably mounting the second web loop feeler on the base adjacent the second turntable structure, and second means releasably coupled to the second web loop feeler and connected to the second turntable rotating means for controlling the second turntable rotating means to maintain the second web loop, and means for mounting the base for manual removal relative to the first and second peripheral portion engaging means, web capstan and first and second means for controlling the first and second turntable rotating means.

The invention resides also in apparatus for transporting a web from a first reel to a distinct second reel with the aid of a web transport including first reel drive means having a first rotary drive member, and second reel drive means having a second rotary drive member. The invention according to this aspect resides, more specifically, in the improvement comprising, in combination, a casing including a base manually positionable and selectively removable relative to the first and second rotary drive members, a first turntable structure rotatably mounted on the base for removably receiving, supporting and rotating the first reel, the first turntable structure having a first peripheral portion engageable by the first rotary drive member, and a distinct second turntable structure rotatably mounted on the base for removably receiving, supporting and rotating the second reel, the second turntable structure having a second peripheral portion engageable by the second rotary drive member, the casing including a cover complementing the base for housing the first and second reels when placed on the first and second turntable structures, respectively, hinge means for hinging the cover to the base, and means on the cover inside the casing for releasably retaining the reels in the casing.

From another aspect thereof, the subject invention resides in a cartridge for housing a web and distinct first and second reels for that web comprising, in combination, a base portion, a first turntable structure for removably receiving, supporting and rotating the first reel, a second turntable structure for removably receiving, supporting and rotating the second reel, and a cover complementing the base portion for housing the first and second reels when placed on the first and second turntable structures, respectively, hinge means for hinging the cover to the base portion, and means on the cover inside the cartridge for releasably retaining the reels inside the cartridge.

From a further aspect thereof, the subject invention resides in apparatus for transporting a web from a first reel to a distinct second reel with the aid of a web transport including first reel drive means having a first rotary drive member and first motor means for rotating the first rotary drive member, second reel drive means having a second rotary drive member, and second motor means for rotating the second rotary drive member, means including a web capstan for driving the web between the first and second reels, means for forming a first web loop between the first reel and the web capstan including first means connected to the first motor means for controlling the first motor means to maintain the first web loop, and means for forming a second web loop between the second reel and the web capstan including second means connected to the second motor means for controlling the second motor means to maintain the second web loop. The invention according to this aspect resides, more specifically, in the improvement comprising, in combination, means for rotating the first reel including a first turntable structure for removably receiving, supporting and rotating the first reel, the first turntable structure having a peripheral portion engageable by the first rotary drive member for rotation of the first turntable structure via the peripheral portion, means for rotating the second reel including a distinct second turntable structure for removably receiving, supporting and rotating the second reel, the second turntable structure having a peripheral portion engageable by the second rotary drive member for rotation of the second turntable structure via the peripheral portion of the second turntable structure, and a base for jointly supporting and rotatably mounting the first and second turntable structures, the first loop forming means including a first web loop feeler, means for yieldably mounting the first web loop feeler on the base adjacent the first turntable structure and for releasably coupling the first web loop feeler to the first means for controlling the first motor means to maintain the first web loop, the second loop forming means including a second web loop feeler, means for yieldably mounting the second web loop feeler on the base adjacent the second turntable structure and for releasably coupling the second web loop feeler to the second means for controlling the second motor means to maintain the second web loop, and the base being manually removable relative to the first and second rotary drive members, web capstan, first and second motor means, and first and second means for controlling the first and second motor means.

From another aspect thereof, the subject invention resides in apparatus for transporting a web from a first reel to a distinct second reel, comprising, in combination, means for rotating the first reel including a first turntable structure for removably receiving, supporting and rotating the first reel, means for carrying the first turntable structure including a first bearing, a first spindle rotatable in the bearing, the first spindle being attached to the first turntable structure and having means for engaging the first reel in driving relationship, and first means for engaging a peripheral portion of the first turntable structure and for rotating the first turntable structure via the peripheral portion, means for rotating the second reel including a distinct second turntable structure for removably receiving, supporting and rotating the second reel, means for carrying the second turntable structure including a second bearing, a second spindle rotatable in the second bearing, the second spindle being attached to the second turntable structure and having means for engaging the second reel in driving relationship, and second means for engaging a peripheral portion of the second turntable structure and for rotating the second turntable structure via the peripheral portion of the second turntable structure, means for forwarding the web from either of the first and second reels to the other reel, and a removable casing having a bottom portion, the first and second bearings being affixed to the bottom portion for rotatably mounting the first and second spindles, and a mating top portion selectively movable toward and away from the bottom portion for housing the first and second reels when placed on the first and second turntable structures, respectively, the top portion having for each of the first and second spindles inwardly projecting means preventing the first and second reels from falling off the first and second turntable structures when the top portion is closed.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which:

FIG. 2 is a perspective view of a web or tape cartridge according to a preferred embodiment of the invention that may be employed in the apparatus of FIG. 1;

FIGS. 3 and 4 are fractional top and rear views of FIG. 2 showing a detail of the cartridge according to a preferred embodiment of the invention;

FIG. 7 is a partial top view of a modification of the cartridge of FIG. 2, in accordance with a preferred embodiment of the subject invention;

DESCRIPTION OF PREFERRED EMBODIMENTS

Figure 1:
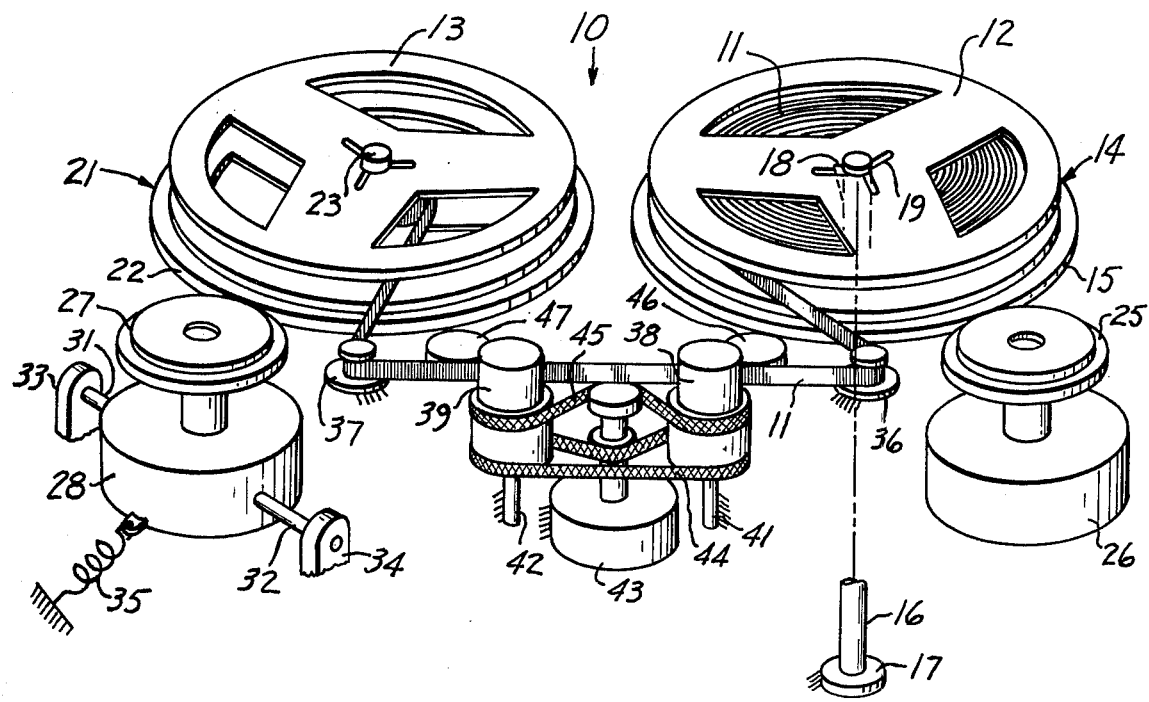
FIG. 1 is a perspective view of a web or tape transport in accordance with a preferred embodiment of the subject invention.

FIG. 1 shows essential parts of an apparatus 10 for transporting a web or tape 11 from a first reel 12 to a second reel 13.

The first reel 12 is removably received, supported and rotated by a first turntable structure 14 having a peripheral driven portion 15. A spindle 16, shown in FIG. 1 in an exploded view for better visibility, is rotatable in a bearing 17. The spindle 16 has a spline 18 for engaging the reel 12 in driving relationship through one of a number of slots 19 in the reel.

The second reel 13 is similarly removably received, supported and rotated by a distinct second turntable structure 21 which has a driven peripheral portion 22. A spindle 23 is associated with the second turntable structure 21 and has a spline (not shown) similar to the spline 18 and a bearing (not shown) similar to the bearing 17. Both turntables may be carried by their associated spindle by being physically attached thereto. A reel torque puck 25 is rotated by a reel motor 26 and, in turn, rotates the turntable structure 14 and reel 12 through force-transmitting engagement of the peripheral turntable portion 15.

Similarly, a reel torque puck 27 is rotated by a reel motor 28 and rotates the second turntable structure 21 and tape reel 13 through engagement of the peripheral turntable surface 22.

As shown by way of example in connection with the reel motor 28, each reel motor 26 and 28 may be tiltably mounted by pins 31 and 32 held in bearings 33 and 34. The puck 25 or 27 may be biased into engagement with the peripheral drive portion 15 or 22 by a spring 35 which acts on the reel motor as shown in FIG. 1.

Means for guiding the tape 11 from either of the first and second reels 12 and 13 are located adjacent the turntable structures 14 and 21. In particular, a first tape guide 36 is located adjacent the turntable structure 14, and a second tape guide 37 is located adjacent the turntable structure 21. The tape guides 36 and 37 may be fixed or movable, as desired or necessary in a given application.

The tape transport according to the illustrated preferred embodiments is of the dual capstan type, although the subject invention is not so limited.

In particular, the illustrated tape drive has a first capstan 38 and a second capstan 39 spaced from the first capstan. The capstans 38 and 39 may be rotatable on stationary shafts 41 and 42, respectively, or the shafts 41 and 42 may be attached to the capstans 38 and 39, respectively, and be rotatable in bearings (not shown). A capstan motor 43 drives the capstans 38 and 39 via belts 44 and 45. Pinch rollers 46 and 47 press the tape 11 against the capstans 38 and 39, respectively, for advancement of the tape in either direction between the reels 12 and 13.

In accordance with a preferred embodiment of the subject invention, the turntable structures 14 and 21 are jointly supported by a base 51 which also supports the tape guides 36 and 37 and pinch rollers 46 and 47. In particular, the bearings 17 are affixed to the base 51 for rotatably mounting the spindles 16 and 23 of the turntable structures 14 and 21.

The pinch rollers 46 and 47 preferably are yieldably mounted on the base 51 by arms 53 and 54 pivoted at 55 and 56.

In accordance with a preferred embodiment of the subject invention, the base 51 is mounted for manual removal relative to the reel drives with pucks 25 and 26 and capstans 38 and 39.

Preferably, the base 51 is part of a bottom or base portion 58 of a tape cartridge 59 which has a mating or complementary top or cover portion 61.

In the illustrated preferred embodiment shown in FIG. 2, the cartridge parts 58 and 61 are hinged to each other along one side by a hinge 62 in a clam shell type of arrangement.

The cartridge 69 may be opened by swinging the top portion 61 away from the bottom portion 68 so that the turntable structures 14 and 21 are exposed for a reception of reels 12 and 13.

After the tape reels have been positioned on the turntable structures 14 and 21 and the tape threaded between tape reels 12 and 13, the cartridge 59 is closed by swinging the top portion 61 toward the bottom portion until latch portions 64 in the top part 61 of the cartridge have engaged their counterparts 65 in the bottom part 58.

In accordance with a preferred embodiment of the invention, the bottom and top parts 58 and 61 of the cartridge have corresponding recesses 67 at the hinge 62, preferably in a mid portion of the cartridge between its lateral sides. These recesses 66 and 67 constitute finger grip means for facilitating manual engagement and removal of the casing or cartridge 59.

After the reels 12 and 13 have been positioned on the turntable structures 14 and 21 and the top or cover part 61 has been swung against the base or bottom portion 51, the cartridge 59 defines an opening at 69 through which the tape 11 is accessible to drive capstans 38 and 39, to tape recording and playback or other function-performing equipment, and to the turntable and reel drive pucks 25 and 27.

Figure 6:
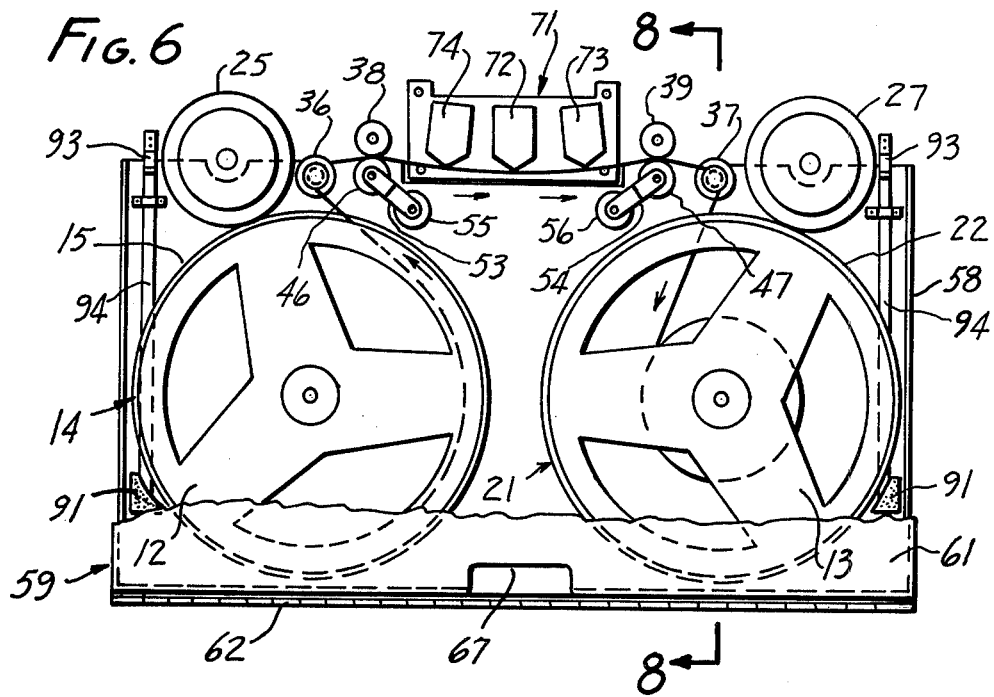
FIG. 6 is a top view of a portion of the apparatus of FIG. 5 with parts removed for increased visibility.
Figure 5:
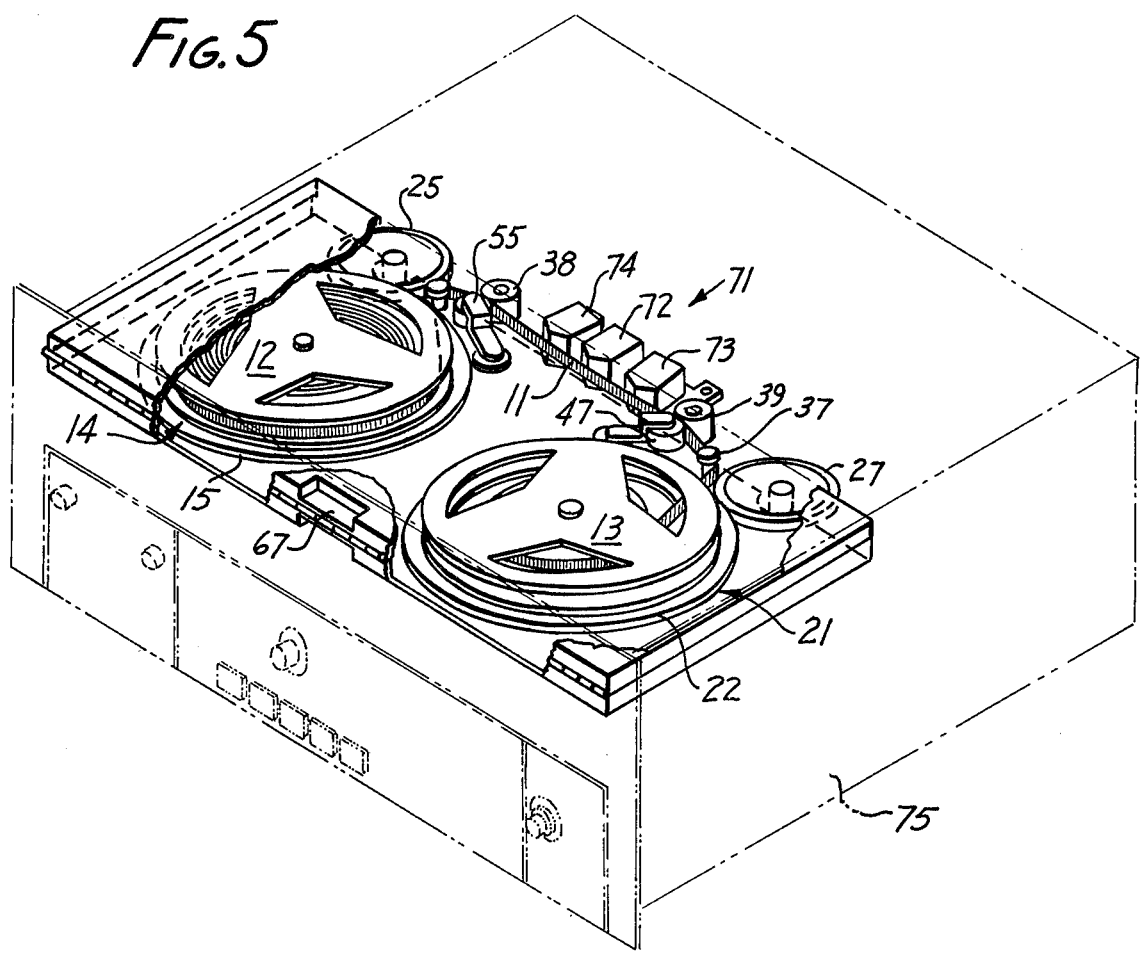
FIG. 5 is a perspective view of a magnetic tape recording and playback apparatus employing the tape transport and cartridge according to the illustrated preferred embodiments of the subject invention.

Suitable function-performing means 71 are shown in FIGS. 5 and 6 as including magnetic record, reproduce and erase heads 72, 73 and 74. These may be part of a magnetic tape recording and reproducing apparatus 75 as shown in FIG. 5. The closed cartridge 69 with turntable structures 14 and 21, positioned or loaded reels 12 and 13, tape guides 36 and 37 and pinch rollers 46 and 47, is front-loadable into the apparatus 75.

In this manner, the cartridge 59 including its base portion 51 is manually positionable and selectively removable relative to the first and second rotary drive members or pucks 25 and 27, capstans 38 and 39 and function-performing heads 37 to 74. Manual removal of the cartridge 59 from the apparatus 75 is facilitated by the finger grip portions 66 and 67 in the clamp-shell type cartridge.

In accordance with a further preferred embodiment of the subject invention, the tape transport includes loop formers or tape tensioners, part of which are located on the tape cartridge and part of which are located on the apparatus 75. A preferred embodiment of this principle according to the subject invention will now be disclosed with reference to FIG. 7.

In particular, a first tape loop 81 is formed between the first tape reel 12 and turntable structures 14, on the first hand, and the tape capstan 38 on the other hand. The means for forming the first tape loop include a first tape loop feeler 82 which is yieldably mounted on the base 51 adjacent the first turntable structure 14 by an arm 83 pivoted at 84. The first tape loop forming means under consideration also includes a tape loop sensor 86 having an arm 87 engaging the feeler 82 upon insertion of the cartridge into the apparatus 75.

The arm 87 is biased by a spring 88 and actuates a rotary potentiometer or other angular sensing device 89 for providing a motor control 91 for the reel motors 26 with a signal varying in terms of angular position of the arm 87 and thus indicative of the size of the tape loop 81.

The reel motor control 91 controls the motor 26 in a conventional manner to maintain the tape loop 81 within desired tolerances.

Corresponding tape loop forming equipment is located adjacent the second turntable structure 21 to form and maintain a second tape loop 81' at that location. Such corresponding equipment controls the reel drive motor 28 and has parts designated by reference numerals which bear a prime (') relative to their functionally equivalent counterparts adjacent the first turntable structure 14.

The tape loop sensors 86 and 86' with arms 87 and 87', potentiometers or rotary signal generating devices 89 and 89' and motor controls 91 and 92' are allocated to the apparatus 75. The tape loop feelers 82 and 82' with arms 83 and 83', on the other hand, are mounted on the base 51 and removable with the cartridge 59. Stops 93 and 93' may be provided to prevent the arms 83 and 83' from swinging to a position beyond the length of the sensor arms 87 and 87'. Similar stops 95 and 95' may be provided for the sensor arms 87 and 87'.

The tape reels 12 and 13 or the turntable structures 14 and 21 may be arrested to prevent movement thereof and uncoiling of the tape when the cartridge is not in use. To this end, each turntable structure may be equipped with a brake 101 which is applied to or biased against the peripheral surface 15 or 22 by a spring 102 as shown in FIG. 2.

As further shown in FIG. 6, a relatively stationary brake release finger 103 is engaged by a linkage 104 when the cartridge is inserted into the recording or reproducing apparatus 75. The release finger 103 thus in effect pushes the linkage 104 into the cartridge, whereby the brake 101 carried by the linkage 104 is released from the peripheral surface 15 or 22 against the bias of the spring 102.

Each brake 101 is then again applied to the corresponding turntable structure when the cartridge is removed from the apparatus 75 and the linkage 104 is thus separated from the finger 103.

Figure 8:
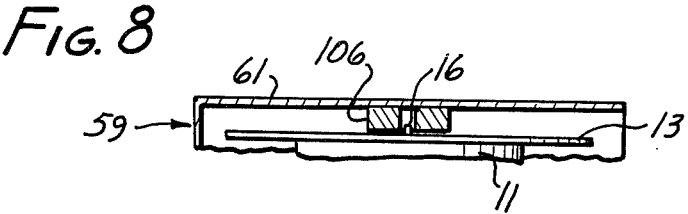
FIG. 8 is a fractional section along the line 8 — 8 in FIG. 6.
Figure 9:
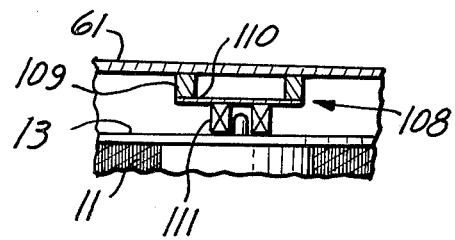
FIG. 9 is a view similar to FIG. 8 on an enlarged scale illustrating a modification.

According to the illustrated preferred embodiment of the invention shown in FIGS. 8 and 9, the cartridge 59 may include means for releasably retaining the reels on their turntables 14 and 21.

For instance, as shown in FIG. 8, the cartridge top or cover portion 61 may have an inwardly projecting block or annulus 106 which accommodates the top of the spindle 16 and also prevents the reel 13 from falling off the turntable when the cover portion 61 of the cartridge is closed.

The same block 106 may be provided inside the cover portion 61 adjacent the spindle 23.

An effect similar to that of block 106 may be achieved by placing the cover portion 61 itself closely to the reels 12 and 13.

In some applications, such as when the cartridge 59 is used in a vertical or in an upside-down position, the block or blocks 106 may be replaced by a thrust bearing or bearings 108 having a hollow or hollow-cylindrical block 109 provided with a resilient mounting means 110, such as a spring diaphragm or membrane or radical spring fingers. The mounting means 110 resiliently carries a thrust bearing 111 which, in turn, engages the reel 12 or 13 for retention between the bearing 111 and turntable 14 or 21 when the cartridge 59 is closed.

The subject extensive disclosure will suggest or render apparent various modifications and variations within the spirit and scope of the invention to those skilled in the art.

I claim:

1. Apparatus for transporting a web from a first reel to a distinct second reel, comprising in combination:
   means for rotating said first reel including a first turntable structure for removably receiving, supporting and rotating said first reel, and first means for engaging a peripheral portion of said first turntable structure and for rotating said first turntable structure via said peripheral portion;
   means for rotating said second reel including a distinct second turntable structure for removably receiving, supporting and rotating said second reel, and second means for engaging a peripheral portion of said second turntable structure and for rotating said second turntable structure via said peripheral portion of the second turntable structure;
   means including a web capstan for driving said web between said first and second reels;

a base for jointly supporting and rotatably mounting said first and second turntable structures;

means for forming a first web loop between said first turntable structure and said web capstan, said first loop forming means including a first web loop feeler, means for yieldably mounting said first web loop feeler on said base adjacent said first turntable structure, and first means releasably coupled to said first web loop feeler and connected to said first turntable rotating means for controlling said first turntable rotating means to maintain said first web loop;

means for forming a second web loop between said second turntable structure and said web capstan, said second loop forming means including a second web loop feeler, means for yieldably mounting said second web loop feeler on said base adjacent said second turntable structure, and second means releasably coupled to said second web loop feeler and connected to said second turntable rotating means for controlling said second turntable rotating means to maintain said second web loop; and means for mounting said base for manual removal relative to said first and second peripheral portion engaging means, web capstan and first and second means for controlling said first and second turntable rotating means.

2. Apparatus as claimed in claim 1, including: rotatable means for pressing said web against said capstan; and means for yieldably mounting said web pressing means on said base.

3. Apparatus as claimed in claim 1, including:

a removable casing including said removable base for jointly supporting and rotatably mounting said first and second turntable structures and for yieldably mounting said first and second web loop feelers, and including a cover complementing said base for housing said first and second reels when placed on said first and second turntable structures, respectively.

4. Apparatus as claimed in claim 3, including:

hinge means for hinging said cover to said base.

5. Apparatus as claimed in claim 3, including:

finger grip means in said base and cover at said hinge means for facilitating manual engagement and removal of said casing.

6. Apparatus as claimed in claim 3, including:

means in said casing for selectively arresting said turntable structure inside said casing.

7. Apparatus as claimed in claim 3, including:

means inside said casing for releasably retaining said reels in said casing.

8. Apparatus as claimed in claim 7, wherein:

said retaining means include a block projecting into said casing.

9. Apparatus as claimed in claim 7, wherein:

said retaining means include thrust bearing means inside said casing for engaging said received reels.

10. In apparatus for transporting a web from a first reel to a distinct second reel with the aid of a web transport including first reel drive means having a first rotary drive member and first motor means for rotating said first rotary drive member, second reel drive means having a second rotary drive member, and second motor means for rotating said second rotary drive member, means including a web capstan for driving said web between said first and second reels, means for forming a first web loop between said first reel and said web capstan including first means connected to said first motor means for controlling said first motor means to maintain said first web loop, and means for forming a second web loop between said second reel and said web capstan including second means connected to said second motor means for controlling said second motor means to maintain said second web loop, the improvement comprising in combination:

means for rotating said first reel including a first turntable structure for removably receiving, supporting and rotating said first reel, said first turntable structure having a peripheral portion engageable by said first rotary drive member for rotation of said first turntable structure via said peripheral portion;

means for rotating said second reel including a distinct second turntable structure for removably receiving, supporting and rotating said second reel, said second turntable structure having a peripheral portion engageable by said second rotary drive member for rotation of said second turntable structure via said peripheral portion of the second turntable structure; and a base for jointly supporting and rotatably mounting said first and second turntable structures;

said first loop forming means including a first web loop feeler, means for yieldably mounting said first web loop feeler on said base adjacent said first turntable structure and for releasably coupling said first web loop feeler to said first means for controlling said first motor means to maintain said first web loop;

said second loop forming means including a second web loop feeler, means for yieldably mounting said second web loop feeler on said base adjacent said second turntable structure and for releasably coupling said second web loop feeler to said second means for controlling said second motor means to maintain said second web loop; and said base being manually removable relative to said first and second rotary drive members, web capstan, first and second motor means, and first and second means for controlling said first and second motor means.

11. Apparatus as claimed in claim 10, including:

a manually positionable and selectively removable casing including said base for jointly supporting said first and second turntable structures, and including a cover complementing said base for housing said first and second reels when placed on said first and second turntable structures, respectively.

12. Apparatus as claimed in claim 11, including:

hinge means for hinging said cover to said base.

13. Apparatus as claimed in claim 12, including:

finger grip means in said base and cover at said hinge for facilitating manual engagement and removal of said casing.

14. Apparatus as claimed in claim 10, including:

web guiding means on said base.

15. Apparatus as claimed in claim 10, including:

means for pressing said web against said web drive capstan; and means for yieldably mounting said web pressing means on said base.

16. Apparatus as claimed in claim 10, including:

means for pressing said web against said web drive capstan; and means for yieldably mounting said web pressing means on said base between said first and second web loop feelers.

17. Apparatus as claimed in claim 10, including:
means in said casing for selectively arresting said turntable structures inside said casing.

18. Apparatus as claimed in claim 10, including: means inside said casing for releasably retaining said reels in said casing.

19. Apparatus as claimed in claim 18, wherein:
said retaining means include a block projecting into said casing.

20. Apparatus as claimed in claim 18, wherein:
said retaining means include thrust bearing means inside said casing for engaging said received reels.

* * * * *